United States Patent
Zwanenburg et al.

(10) Patent No.: US 7,443,104 B2
(45) Date of Patent: Oct. 28, 2008

(54) LIGHTING APPARATUS AND METHOD FOR CONTROLLING BRIGHTNESS AND COLOR LOCATION THEREOF

(75) Inventors: Michel Zwanenburg, Northville, MI (US); Timothy Daniel Dunn, Northville, MI (US)

(73) Assignee: Osram Opto Semiconductors GmbH, Regensburg (DE)

( * ) Notice: Subject to any disclaimer, the term of this patent is extended or adjusted under 35 U.S.C. 154(b) by 623 days.

(21) Appl. No.: 11/191,145

(22) Filed: Jul. 27, 2005

(65) Prior Publication Data

US 2007/0024210 A1     Feb. 1, 2007

(51) Int. Cl.
*H05B 37/00* (2006.01)

(52) U.S. Cl. .................. 315/209 R; 315/224; 315/291

(58) Field of Classification Search ............. 315/291, 315/224, 209 R, 246, 250, 302, 169.3
See application file for complete search history.

(56) References Cited

U.S. PATENT DOCUMENTS

| | | | |
|---|---|---|---|
| 6,956,337 B2 * | 10/2005 | Kemper | 315/307 |
| 7,173,383 B2 * | 2/2007 | Vornsand et al. | 315/291 |
| 2002/0070914 A1 | 6/2002 | Bruning et al. | 345/102 |
| 2004/0155608 A1 | 8/2004 | Trinschek et al. | 315/291 |

OTHER PUBLICATIONS

Search Report from the European Patent Office dated Nov. 22, 2006, for Application No. 06012415.3-2205 by Examiner Iacopo Giancane.

* cited by examiner

*Primary Examiner*—David Hung Vu
(74) *Attorney, Agent, or Firm*—Fish & Richardson P.C.

(57) ABSTRACT

A lighting apparatus emitting polychromatic light comprising light of at least two light-channels with different colors, wherein each light-channel is controlled by one modified pulse-width-modulated signal (modified PWM-signal), and each modified PWM-signal results from the modulation of one color-pulse-width-modulated signal (color-PWM-signal) with an intensity-pulse-width-modulated signal (intensity-PWM-signal) in order to control the brightness and color location of the polychromatic light.

14 Claims, 3 Drawing Sheets

LIGHTING APPARATUS AND METHOD FOR CONTROLLING BRIGHTNESS AND COLOR LOCATION THEREOF

FIELD OF THE INVENTION

The present invention relates to a lighting apparatus and a method for controlling brightness and color location thereof. In particular, the invention relates to a lighting apparatus emitting polychromatic light comprising light of different colors emitted by semiconductor light-emitting diodes (LEDs).

BACKGROUND OF THE INVENTION

Lighting apparatus, for example used for back-lighting of LCD-displays, usually emit polychromatic light, such as light with a color location in the white region of the CIE-diagram. For the generation of polychromatic light, lighting apparatus usually comprise primary light sources emitting light with different colors, which is mixed additively to produce the desired polychromatic light. In order to control brightness and color location of the polychromatic light, the primary light sources of the lighting apparatus have to be controlled.

SUMMARY OF THE INVENTION

One object of the present invention is to provide an improved method for controlling brightness and color location of a lighting apparatus emitting polychromatic light.

A further object of the present invention is to provide a lighting apparatus emitting polychromatic light with improved control of brightness and color location.

A lighting apparatus emitting polychromatic light comprising light of at least two color channels emitted by primary light sources is provided, wherein the brightness of the primary light sources can be controlled by pulse-width-modulated-signals (PWM-signals).

A PWM-signal is an electrical signal with a fundamental period T. The fundamental period T comprises a time interval $T_{ON}$, in which the PWM-signal is enabled, and a time interval $T_{OFF}$, in which the PWM-signal is disabled. The ratio $T_{ON}/T=T_{ON}/(T_{ON}+T_{OFF})$ is called duty cycle dc of the PWM-signal and gives the percentage of the fundamental period T, in which the PWM-signal is enabled. Preferably, the PWM-signal is a square wave signal.

Primary light sources whose brightness can be controlled by PWM-signals are, for example, semiconductor light emitting diodes (LEDs), organic light emitting diodes (OLEDs), laser diodes or electroluminescent foils.

A method for controlling the brightness and color location of a lighting apparatus emitting polychromatic light comprising light of at least two color channels with different colors is disclosed, wherein:
  each light-channel is controlled by one modified pulse-width-modulated signal (modified PWM-signal), and
  each modified PWM-signal results from the modulation of one color-pulse-width-modulated signal (color-PWM-signal) with an intensity-pulse-width-modulated signal (intensity-PWM-signal).

The color location of the polychromatic light is determined by the ratio(s) of the different duty cycles of the color-PWM-signals controlling the primary light sources generating the light of the color channels. In order to adjust the brightness of the lighting apparatus to a desired value, each color-PWM-signal has to be adjusted in such a way that the ratio(s) of the duty cycles remain(s) unchanged. In particular, if a low brightness of the polychromatic light is desired, very small duty cycles might be required. In order to provide such small duty cycles, the originally applied color-PWM-signals are modulated with a further PWM-signal, the intensity-PWM-signal. The modulation of the color-PWM-signal is preferably carried out by multiplying it with the intensity-PWM-signal.

Since the small duty cycles of the PWM-signal are achieved by the modulation of the color-PWM-signal with the intensity-PWM-signal, the use of an expensive high resolution PWM-generator for controlling the brightness and color location can be avoided advantageously.

In a preferred embodiment of the invention, the intensity-PWM-signal has a fundamental period which is significantly shorter than the fundamental period of the color-PWM-signal. Preferably, the fundamental period of the intensity-PWM-signal is shorter than the fundamental period of the color-PWM-signal by at least one order of magnitude.

If the fundamental period of the intensity-PWM-signal is much shorter than the fundamental period of the color-PWM-signal, a modified PWM-signal with a very small duty cycle is generated, which allows precise control of the color location of the polychromatic light, even at low brightness.

Alternatively, it is also possible that the fundamental period of the intensity-PWM-signal is significantly longer than the fundamental period of the color-PWM-signal, preferably by at least one order of magnitude.

In a preferred embodiment of the invention, the color-PWM-signals are modulated with the same intensity-PWM-signal to generate the modified PWM-signal. This has the advantage that only one additional PWM-signal is required, which simplifies controlling.

Preferably, the polychromatic light has a desired color location within the white region of the CIE-diagram, since lighting apparatus emitting white light can be used for many applications, for example for back-lighting an LCD-display.

In a further preferred embodiment of the invention, the polychromatic light comprises the light of one red, one green and one blue color channel. Since these three primary colors, red, green and blue, span a major region within the CIE-diagram, a large variation in the color location of the polychromatic light can be achieved advantageously. Furthermore, the region of the CIE-diagram spanned by the primary colors comprises the white region of the CIE-diagram, which means that each color location of the polychromatic light within the white region of the CIE-diagram can be achieved by mixing the light of color channels.

Alternatively, the polychromatic light preferably comprises the light of one yellow, one cyan and one magenta color channel. These primary colors also span a major region of the CIE-diagram, which is different from the region spanned by red, green and blue, but also comprises the white region.

In the following, the present invention is described in further detail on the basis of different embodiments in connection with FIGS. 1, 2A to 2C and 3A to 3C.

PREFERRED EMBODIMENTS OF THE INVENTION

Figure 1:
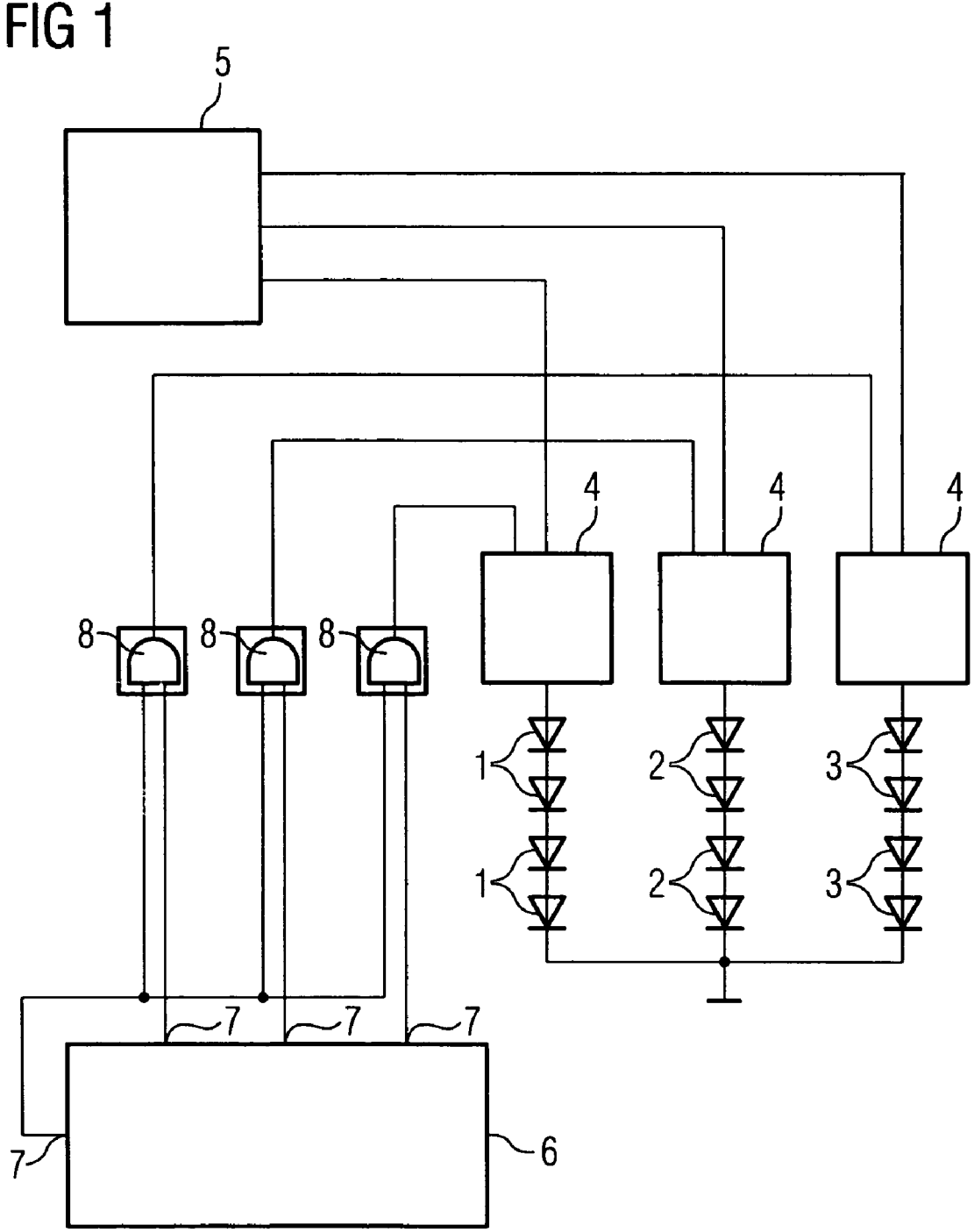
FIG. 1 shows a schematic block diagram of the lighting apparatus according to one embodiment of the invention.

According to the embodiment shown in FIG. 1, the lighting apparatus comprises four red LEDs 1 emitting red light during operation and establishing a red color channel, four green LEDs 2 emitting green light during operation and establishing a green color channel, and four blue LEDs 3 emitting blue light during operation and establishing a blue color channel. The light of the color channels is mixed in such a way that the lighting apparatus emits polychromatic light with a white color location.

The lighting apparatus further comprises a power supply 5, which supplies a voltage to three separate driver units 4, each driving the LEDS 1, 2, 3 of one color channel. Each driver unit 4 provides a constant current signal for each color channel with a maximum current $I_{max}$, which is enabled and disabled by the corresponding modified PWM-signal. In the present embodiment, the value of the maximum current applied to the red color channel $I_{MAX,R}$ is 70 mA, the value of the maximum current applied to the green color channel $I_{MAX,G}$ is 50 mA, and the value of the maximum current applied to the blue color channel $I_{MAX,B}$ is also 50 mA.

For generating the PWM-signals, a control unit 6 with four exits 7 is provided. One exit 7 is used to produce a color-PWM-signal for the red color channel (red color-PWM-signal), one exit 7 is used to produce a color-PWM-signal for the green color channel (green color-PWM-signal) and one exit 7 is used to produce a color-PWM-signal for the blue color channel (blue color-PWM-signal). One exit 7 produces an intensity-PWM-signal, which is multiplied to produce each color-PWM-signal by the use of a logical AND-gate 8 resulting in three modified PWM-signals for each color.

Figure 2A:
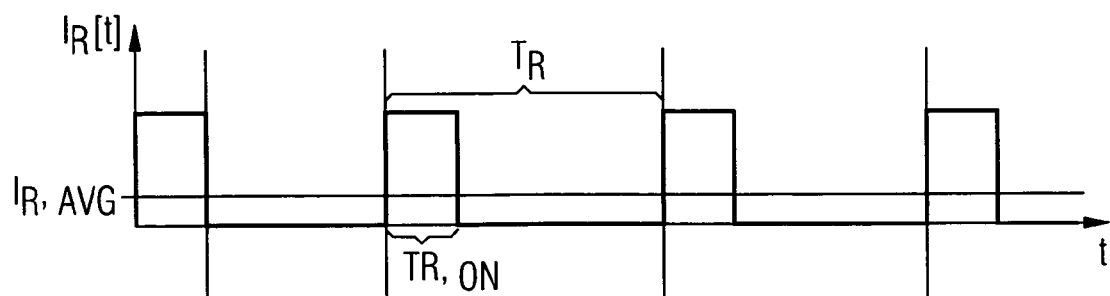
FIGS. 2A to 2C schematically show a color-PWM-signal, an intensity-PWM-signal and a modified PWM-signal according to one embodiment of the invention. Furthermore, FIGS. 2A and 2C schematically show the average current applied to the red color channel by the corresponding PWM-signal.

As shown in FIG. 2A, the red color-PWM-signal $I_R(t)$ is a square wave signal, which is enabled during the time interval $T_{R,ON}$ of a fundamental period $T_R$. The duty cycle $dc_R$ of the red color-PWM-signal $I_R(t)$ is given by $dc_R=T_{R,ON}/T_R$. The average current $I_{R,AVG}$, which is applied to the red color channel, is given by $I_{R,AVG}=dc_R I_{MAX}$. The green color-PWM-signal (not shown) is also a square wave signal, which is enabled during the time interval $T_{G,ON}$ of a fundamental period $T_G$ resulting in a duty cycle $dC_G=T_{G,ON}/T_G$. Equivalently, the blue color-PWM-signal (not shown either), is a further square wave signal, which is enabled during the time interval $T_{B,ON}$ of a fundamental period $T_B$ resulting in a duty cycle $dc_B=T_{B,ON}/T_B$.

Figure 2B:
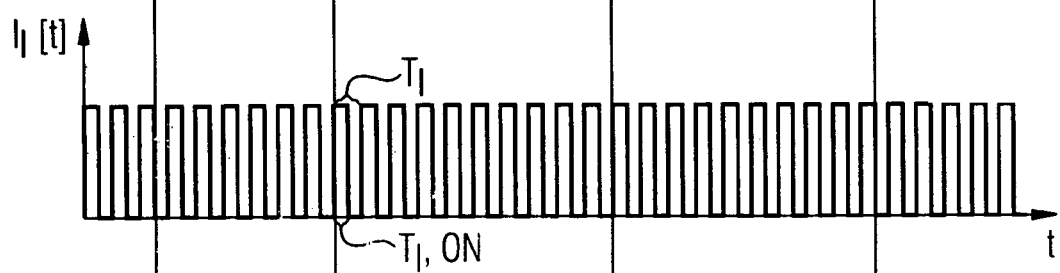

The red color-PWM-signal $I_R(t)$ as shown in FIG. 2A is multiplied by an intensity-PWM-signal $I_I(t)$ as shown in FIG. 2B. The intensity-PWM-signal is enabled during the time interval $T_{I,ON}$ of a fundamental period $T_I$ and has a duty cycle $dc_I=T_{I,ON}/T_I$, wherein the fundamental period $T_I$ is much smaller than the fundamental period of the red color-PWM-signal $T_R$. In the present embodiment, each color-PWM-signal has a fundamental frequency of 200 Hz, while the fundamental frequency of the intensity-PWM-signal is 2 KHz.

Figure 2C:
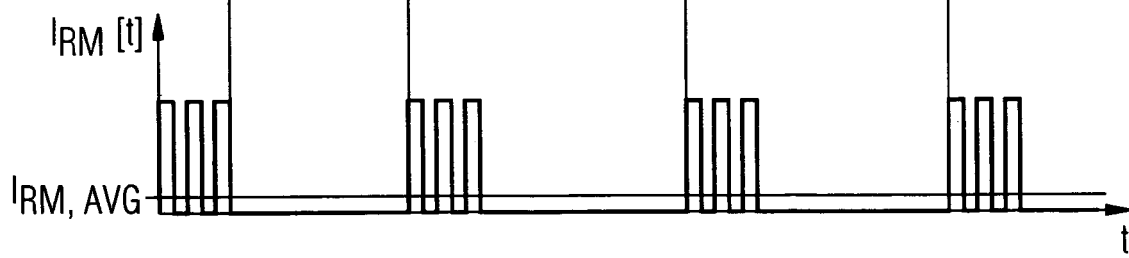

The modified red PWM-signal $I_{RM}(t)$ resulting from the multiplication of the red color-PWM-signal $I_R(t)$ by the intensity-PWM-signal $I_1(t)$ is shown in FIG. 2C. Since the duty cycle of the intensity-PWM-signal $dc_I$ is smaller than the duty cycle of the red color-PWM-signal $dc_R$, the average current applied to the LEDs 1 of the red color channel $I_{RM,AVG}=dc_R dc_I I_{MAX}$ is lower than the average current resulting from the non-modified red color-PWM-signal $I_{R,AVG}$.

Furthermore, the average current resulting from the modified red PWM-signal $I_{RM,AVG}$ can be controlled precisely by adjusting the duty cycle of the intensity-PWM-signal $dc_I$.

According to the present embodiment, the desired color location of the polychromatic light is in the white region of the CIE-diagram and is determined by the following values of the ratios of the duty cycles of the modified PWM-signals applied to the LEDs 1, 2, 3: $dC_{R,M}/dC_{G,M}=0.75$ and $dc_{B,M}/dc_{G,M}=0.65$.

Adjusting the brightness of the polychromatic light emitted by the lighting apparatus by controlling the color location simultaneously is carried out as described in the following in conjunction with a numerical example. At full intensity, which means that the intensity-PWM-signal has a duty cycle $dc_I=1$, the color location of the polychromatic light is adjusted to the desired value. This means that the red color-PWM-signal of the present embodiment has a duty cycle $dc_R=0.75$, the green color-PWM-signal has a duty cycle $dc_G=1$ and the blue color-PWM-signal has a duty cycle $dc_B=0.65$. Since the duty cycle of the intensity-PWM-signal is 1 ($dc_I=1$), the duty cycles of the corresponding modified PWM-signals have the same value as the duty cycles of the color-PWM-signals. If a lower brightness of the polychromatic light is desired, the duty cycle of the intensity-PWM-signal is reduced. Since the intensity-PWM-signal modulates each color-PWM-signal by multiplication, the duty cycle of each color-PWM-signal has to be multiplied by the duty cycle of the intensity-PWM-signal to obtain the reduced duty cycle of the corresponding modified PWM-signal. Therefore, the ratios of the reduced duty cycles of the modified PWM-signals are maintained, and the color location of the polychromatic light emitted by the lighting apparatus is still correct, as is explained in further detail in the following: If the duty cycle of the intensity-PWM-signal according to the present embodiment is halved ($dc_I=0.5$ instead of $dc_I=1$), the duty cycles of the modified color-PWM-signals $dc_{R,M}=dc_R dc_I$, $dc_{G,M}=dc_G dc_I$ and $dc_{B,M}=dc_B dc_I$ are also halved such that $dc_{R,M}=0.75*0.5=0.375$, $dc_{G,M}=1*0.5=0.5$ and $dc_{B,M}=0.65*0.5=0.325$ and the ratios of the duty cycles remain $dc_{R,M}/dc_{G,M}=0.375/0.5=0.75$ and $dc_{B,M}/dc_{G,M}=0.325/0.5=0.65$.

Figure 3A:
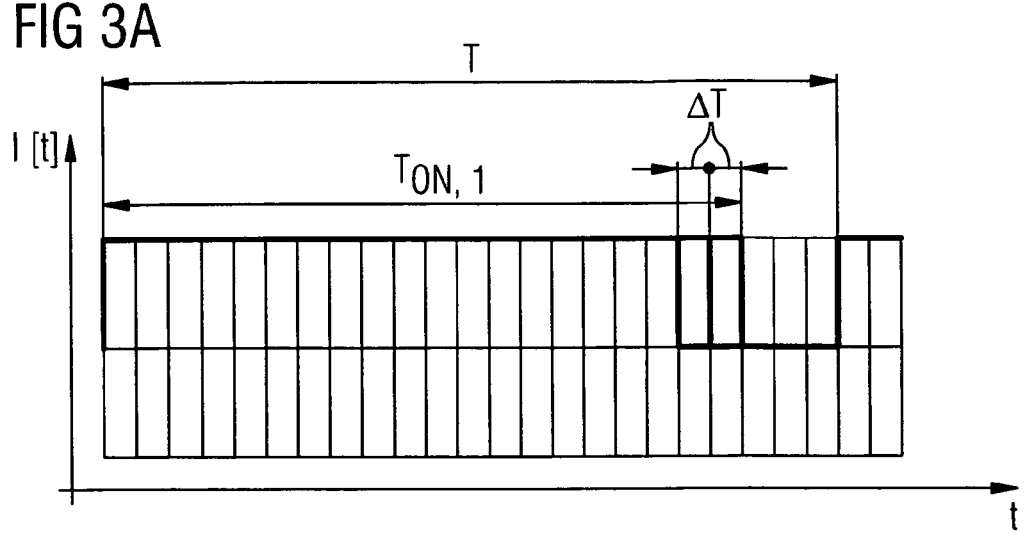
FIGS. 3A to 3C schematically show electrical square wave signals to explain the advantage of the invention in further detail.

In the following, the advantage of the present invention is explained in further detail in connection with FIGS. 3A to 3C. The present invention advantageously allows generation of the PWM-signals by a low resolution PWM-generator, such as an 8-bit resolution PWM-generator, without losing control of the color location of the polychromatic light. Due to the limited resolution of the PWM-generator, the duty cycles of the PWM-signals generated by the PWM-generator can only be changed in steps.

If a lower brightness of the polychromatic light is desired, the duty cycles of the PWM-signals applied to the color channels have to be reduced, and this reduction can be carried out only in steps with a size $\Delta T$. If the basic value of the duty cycle $dc_I=T_{ON,I}/T$ of the PWM-signal I(t) is relatively high, as for example shown in FIG. 3A, the stepwise change of the duty cycle due to the limited resolution of the PWM-generator causes only a small percentage inaccuracy $\Delta T/T_{ON,I}$ in the change of the duty cycle.

Figure 3B:
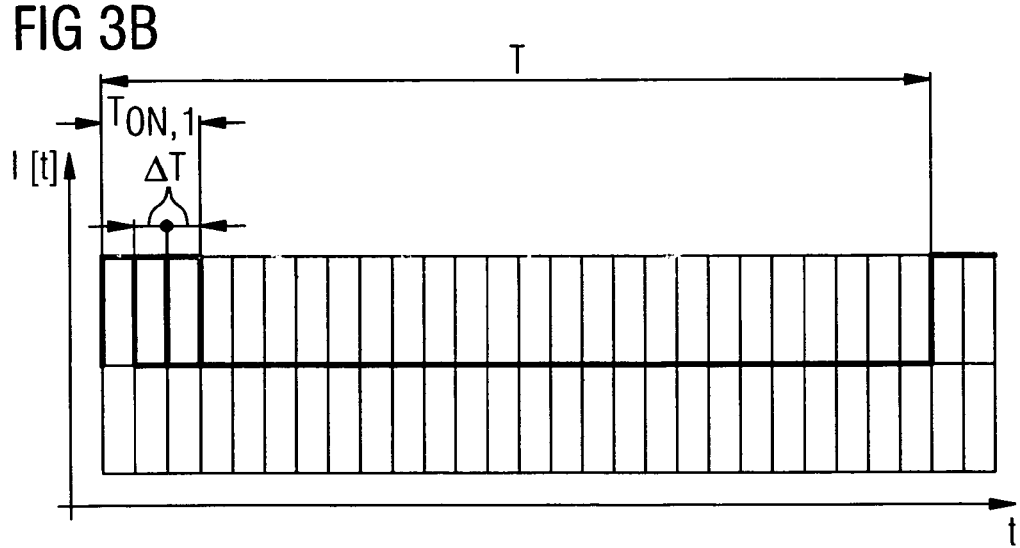
Figure 3C:
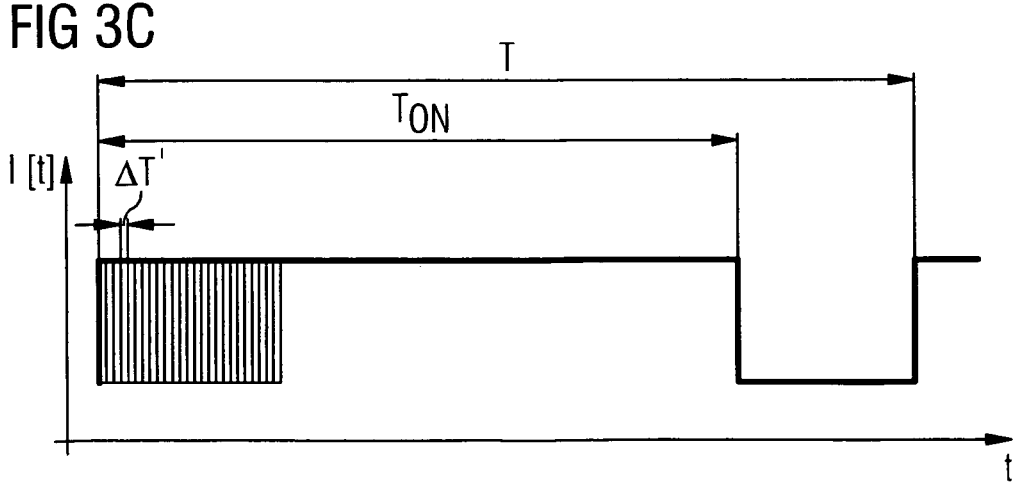

However, if the basic value $T_{ON,I}$ of the duty cycle is quite low already, as shown in FIG. 3B, the inaccuracy $\Delta T/T_{ON,I}$ in the change of the duty cycle due to the limited resolution of the PWM-generator turns into a substantial percentage change. In this case, the brightness of the polychromatic light is reduced, but at the expense of a loss in control of the color location of the polychromatic light. This problem can be avoided by using a PWM-generator with a better resolution, such as a 16-bit PWM generator. In order to avoid the use of a high resolution PWM-generator, the present invention suggests using an additional intensity-PWM-signal with a significantly higher frequency than the color-PWM-signals, which is multiplied by the color-PWM-signals to achieve a modified color-PWM-signal with a significantly smaller step size ΔT', as shown in FIG. 3C.

The scope of the invention is not limited to the examples given here and above. The invention is embodied in each novel characteristic and each combination of characteristics, which particularly includes any combination of the features which are described in the claims, even if this feature or this combination of features is not explicitly referred to in the claims or in the examples.

We claim:

1. A method for controlling brightness and color location of a lighting apparatus emitting polychromatic light comprising light of at least two light-channels with different colors, wherein:
    the method comprises the step of controlling each light-channel by one modified pulse-width-modulated signal (modified PWM-signal), and
    each modified PWM-signal results from the modulation of one color-pulse-width-modulated signal (color-PWM-signal) with an intensity-pulse-width-modulated signal (intensity-PWM-signal).

2. The method of claim 1, wherein
the color-PWM-signals are modulated with the same intensity-PWM-signal.

3. The method of claim 1, wherein
the color-PWM-signals are modulated with the intensity-PWM-signal by multiplying.

4. The method of claim 1, wherein
the polychromatic light comprises the light of one red, one green and one blue light-channel.

5. The method of claim 1, wherein
the polychromatic light comprises the light of one yellow, one cyan and one magenta light-channel.

6. The method of claim 1, wherein
the intensity-PWM-signal has a fundamental period shorter than a fundamental period of the color-PWM signal.

7. The method of claim 1, wherein
the intensity-PWM-signal has a fundamental period shorter than a fundamental period of the color-PWM signal by at least one order of magnitude.

8. The method of claim 1, wherein
the intensity-PWM-signal has a fundamental period longer than a fundamental period of the color-PWM signal.

9. The method of claim 1, wherein
the intensity-PWM-signal has a fundamental period longer than a fundamental period of the color-PWM signal by at least one order of magnitude.

10. The method of claim 1, wherein
the polychromatic light has a desired color location within the CIE-diagram.

11. The method of claim 9, wherein
the desired color location is within the white region of the CIE-diagram.

12. Lighting apparatus emitting polychromatic light comprising at least light of two light-channels with different colors, wherein brightness and color location are controlled using the method of claim 1.

13. Lighting apparatus of claim 12, wherein
the light of the light-channels is emitted by semiconductor light emitting diodes (LEDs), organic light emitting diodes (OLEDs), laser diodes and/or electroluminescent foils.

14. Apparatus for back-lighting an LCD-display with the lighting apparatus of claim 12.

* * * * *